United States Patent [19]

Peifer et al.

[11] 4,007,958
[45] Feb. 15, 1977

[54] PIVOTED WINDOW FOR CAB OF MOTOR VEHICLE

[75] Inventors: Gary S. Peifer, Waynesville; David D. Shulke, Decatur, both of Ill.

[73] Assignee: Caterpillar Tractor Co., Peoria, Ill.

[22] Filed: Apr. 9, 1975

[21] Appl. No.: 566,561

[52] U.S. Cl. .................... 296/28 C; 15/250 R; 15/250.12; 49/391; 98/2.12; 172/781; 296/92

[51] Int. Cl.² ........................................ B62D 25/00

[58] Field of Search ............ 296/28 C, 146, 84 R, 296/84 C, 92, 95 R, 84 A, 84 B, 84 D, 84 G, 84 H; 180/89 R; 49/391; 15/250, 250.21; 172/781; 98/2, 2.12, 93, 2.13, 2.19, 44, 88 R, 88 L; 248/208; 52/201, 202; 105/456; 9/1.5; 114/173, 176

[56] References Cited

UNITED STATES PATENTS

| | | | |
|---|---|---|---|
| 1,274,151 | 7/1918 | Ellison | 114/173 |
| 1,338,004 | 4/1920 | Erret | 296/92 |
| 1,381,116 | 6/1921 | Godwin | 296/92 |
| 2,098,255 | 11/1937 | Morrison | 296/84 C |
| 2,501,013 | 3/1950 | St. Peter | 296/95 R |
| 2,997,333 | 8/1961 | Kaufman | 296/28 C |
| 3,148,466 | 9/1964 | Batko | 172/781 |
| 3,388,944 | 6/1968 | Crehore | 296/28 C |
| 3,802,530 | 4/1974 | Purcell | 296/146 X |
| 3,841,430 | 10/1974 | Babbitt | 296/28 C X |

FOREIGN PATENTS OR APPLICATIONS

| | | | |
|---|---|---|---|
| 4146/11 | 12/1911 | United Kingdom | 296/84 G |
| 732,369 | 6/1955 | United Kingdom | 98/2 |

*Primary Examiner*—Robert J. Spar
*Assistant Examiner*—Winston H. Douglas
*Attorney, Agent, or Firm*—Wegner, Stellman, McCord, Wiles & Wood

[57] ABSTRACT

A motor vehicle has a cab that has forward observation windows in the front wall on opposite sides of the main frame below the windshield, and an access door at one side with cab side windows in the door and on the opposite side. A pivoted, outwardly opening window structure may be used in either location. The window structure has a lock to secure it in any desired position between a sealed closed position and a fully open position. The lock operates by clamping onto a hinge pin, and is readily manually manipulated from inside the cab. As used on a forward observation window, the pivot axis is so located that opening the window does not interfere with a windshield wiper arm and blade for the window that occupies a generally upright parked position near the main frame.

5 Claims, 5 Drawing Figures

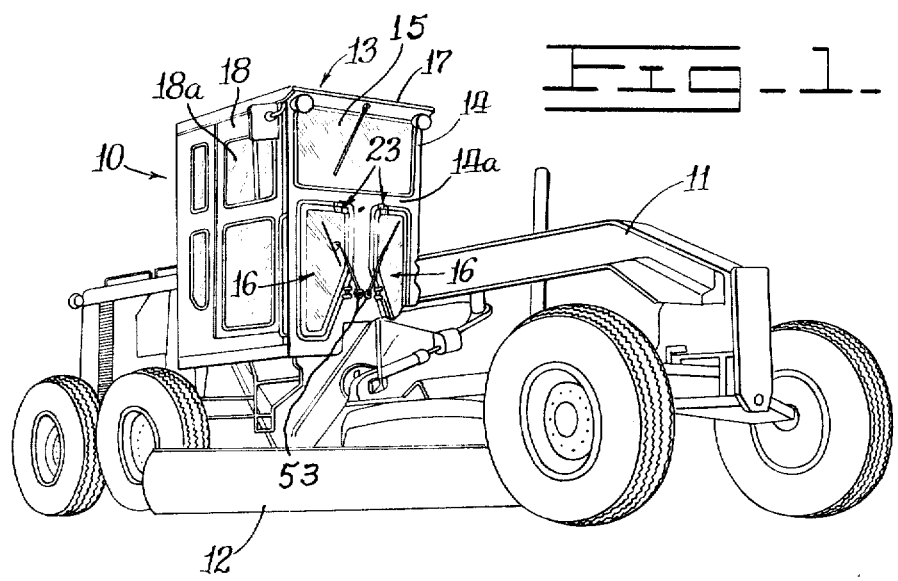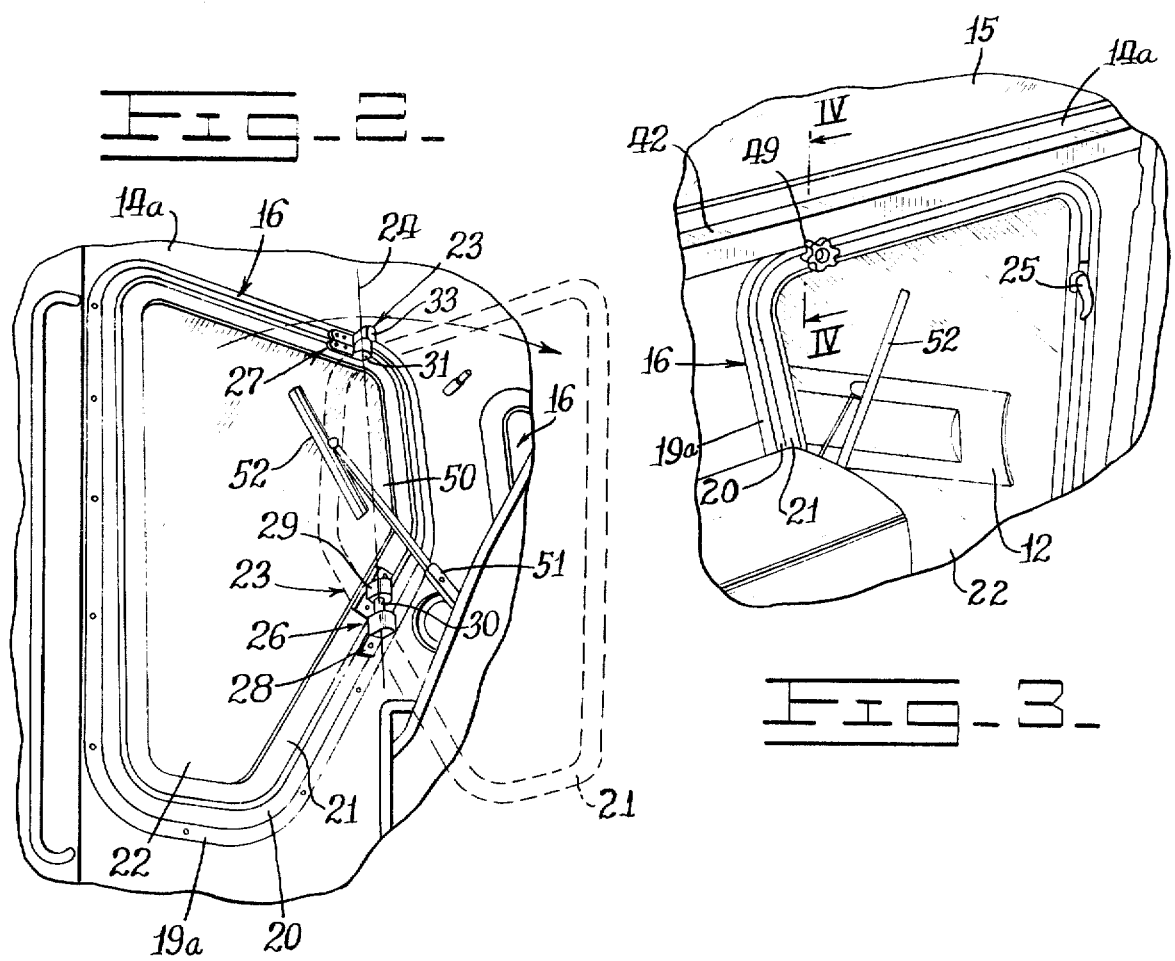

4,007,958

PIVOTED WINDOW FOR CAB OF MOTOR VEHICLE

BACKGROUND OF THE INVENTION

Modern motor graders are provided with cabs that may be sealed to afford an air-conditioned and dust free controlled environment for the operator. This is particularly important because of the enormous amounts of dust that are produced when grading is carried out in fine, dry soil. Commonly, such motor graders have a longitudinal main frame provided by an I beam beneath which the grader blade is mounted, and the cab is at the rear of the I beam with a windshield above the beam and forward observation windows (often called quarter windows) in the front wall which flank the beam so the operator can observe the grader blade and the graded area. Conventional windshield washers and windshield wipers are provided for the windshield and for the windows to assure clear visibility for the operator.

In pleasant weather, some operators prefer to operate with the side door or side windows open to enjoy the fresh air, and this creates a problem of dust collecting in the cab and particularly upon the inside surface of the forward observation windows where it obscures the operator's view of the blade and the graded area. This can result in less efficient grader operation and lower quality grading.

There is also an advantage in having a hinged window in a side door of a cab to afford "anti-draft" ventilation.

In either location, a locking mechanism is essential to secure the window in any desired position between fully closed and fully open.

SUMMARY OF THE INVENTION

In accordance with the present invention, windows for a motor grader cab are hinged on an upright pivot axis so as to open outwardly. Thus, hinged forward observation windows are pivoted on axes near the main frame to swing forwardly, while hinged side windows are pivoted to swing outwardly on axes adjacent their forward extremities. Means are provided for sealing the windows in the window openings when they are closed. Locking means permits the windows to be secured in any desired position, with the locking means functioning on the hinge pivot of a window.

The wipers for the forward observation windows, heretofore referred to, are so mounted and controlled that the wiper arms and blades occupy generally upright parking positions aligned with the window portions that are nearest to the main beam, and the pivot axes for the windows are so located that opening the windows does not interfere with the arms and blades of the parked wipers.

Accordingly, the principal object of the invention is to provide a window for a motor grader which may be firmly secured in any desired position between a closed position sealed in the window opening and fully open position.

Another object of the invention is to provide simple, inexpensive, compact, and easily manipulated locking means for securing hinged windows of a motor grader in any desired position.

Yet another object of the invention is to provide a motor grader in which hinged forward observation windows are mounted in such a way that their movement to open position does not interfere with automatic wipers for the windows.

THE DRAWINGS

FIG. 1 is a fragmentary perspective view of a motor grader viewed from a position forward of and alongside the cab, and shows the location of the forward observation windows;

FIG. 2 is a fragmentary perspective view of the motor grader cab, showing one forward observation window in full line in closed position and in broken line in open position;

FIG. 3 is a fragmentary view taken from the operator's position, showing substantially what he sees when he looks through one of the forward observation windows;

DETAILED DESCRIPTION OF THE INVENTION

Figure 4:
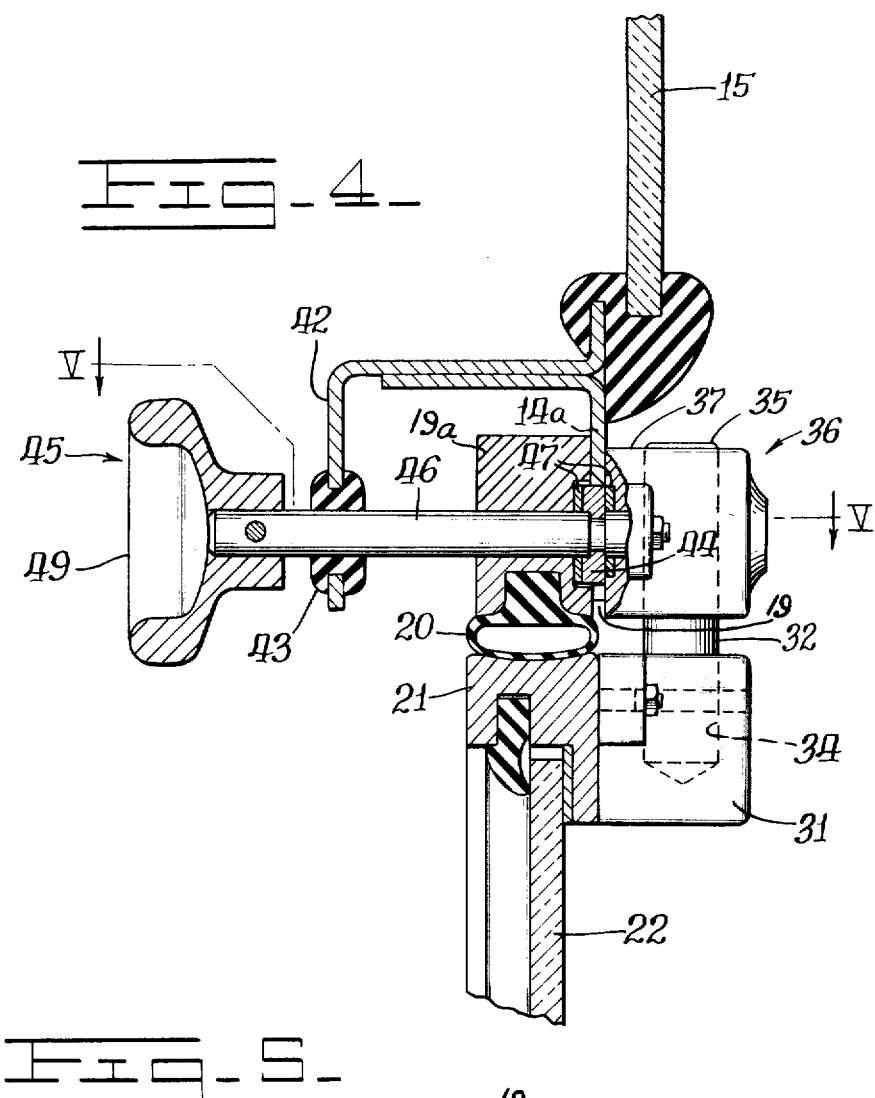
FIG. 4 is a fragmentary vertical sectional view on an enlarged scale taken substantially as indicated along the line IV—IV of FIG. 3.

The drawings illustrate the invention as applied to the forward observation windows of a motor grader.

Referring to the drawings in greater detail, and referring first to FIG. 1, a motor grader, indicated generally at 10, has a longitudinal main beam 11 beneath which a scraper blade 12 is mounted. At the rear end of the main beam 11 is a cab 13 which extends laterally for a substantial distance to both sides of the main beam 11 and has a front wall 14 provided with a windshield 15 and forward observation windows 16 which flank the main beam. A narrow front wall portion 14a is between the tops of the windows 16 and the bottom of the windshield. The cab has a roof 17 and sidewalls with an access door 18 in at least one of the sidewalls, and a window 18a in the door. As illustrated in the drawings, with the forward observation windows 16 and the door 18 and window 18a closed, the cab is effectively sealed so as to provide an air-conditoned and dust free controlled environment for the operator.

Since the two forward observation windows 16 are identical, although oppositely oriented, only the right hand window which is principally illustrated in the drawings will be described in detail. Each window is mounted in a window opening 19 which has a frame 19a in the front wall 14 spaced below the windshield 15 by the width of the front wall portion 14a, and the frame 19a is bordered by a sealing strip 20. A window frame 21 carries shatterproof window glass 22; and hinge means, indicated generally at 23, mounts the window 16 for forward swinging movement about an upright pivot axis 24. As seen in FIG. 2, the window may be swung between a closed position in which it is sealed against the sealing strip 20 and a fully open position in which it is substantially parallel to the side of the main beam 11. As seen in FIG. 3, at the free side of the window frame 21 is a conventional anti-vandalism lock 25 which prevents the window from being opened unless the lock is released.

Figure 5:
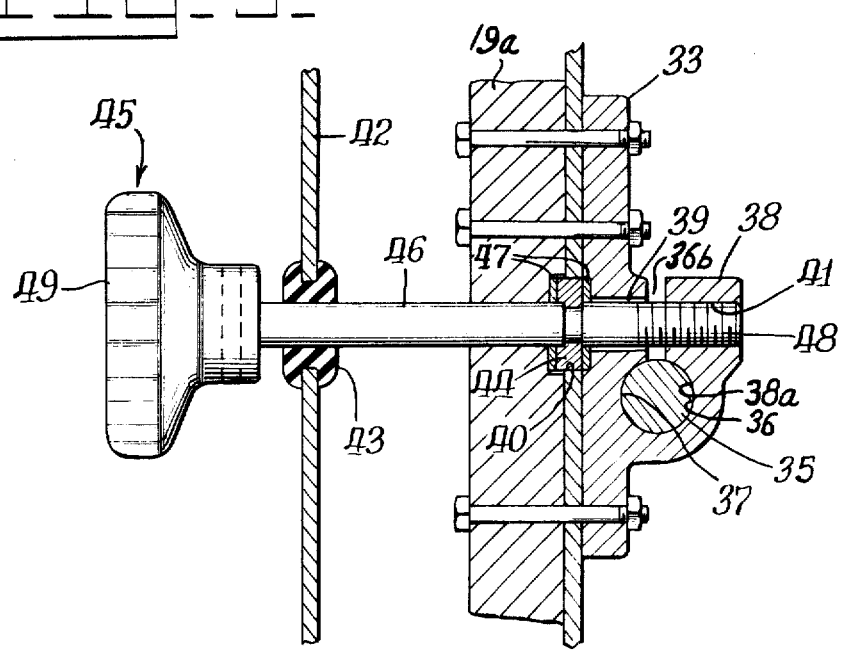
FIG. 5 is a horizontal sectional view taken substantially as indicated along the line V—V of FIG. 4.

Referring now particularly to FIGS. 2, 4 and 5, the hinge means 23 is seen to consist of a lower hinge member 26 and an upper hinge member 27 mounted exteriorly of the cab. The lower hinge member 26 includes a fixed lower hinge bracket 28 mounted on the cab front wall 14 and a movable lower hinge bracket 29 which is mounted upon the window frame 21, and a lower hinge pin 30 which is mounted in one of said hinge brackets and rotates in a complementary opening in the other of said brackets.

The upper hinge member 27 includes a movable upper hinge bracket 31 which is mounted on the window frame and has a blind bore 34 to receive an upright pin 32 the upper portion 35 of which is opposite the front wall portion 14a. A fixed upper hinge bracket 33 is best seen in FIGS. 4 and 5 to be mounted on the outside of the wall portion 14a, and formed integrally with said bracket 33 is a combined hinge element and window locking member in the form of a split collar, indicated generally at 36. The bracket 33 has an arcuate surface 37 and an opposed movable end portion 38 of the split collar 36 has an arcuate surface 38a which define a bore 36a in which the upper portion 35 of the pin 32 is received, and said bore has an open slit 36b at one side. An opening 39 in the bracket 33 is aligned with an opening 40 in the cab front wall portion 14a; and in the movable end portion 38 of the split collar, coaxial with the opening 39, is a threaded bore 41.

The cab has a sill 42 below the windshield that has a hole in which a hollow bearing 43 is mounted in alignment with the hole 40 and the opening 39. A manual locking screw, indicated generally at 45, includes a shaft 46 which is journalled in the bearing 43 and has a portion of reduced diameter in which a bearing 44 is mounted for rotation in the hole 40. Endwise movement of the shaft is prevented by a pair of washers 47 placed in abutting relationship with the adjacent faces of the bearing 44; said inner washer being in a space between the wall 14a and the window frame 21, and the outer washer in a space between the wall 14a and hinge bracket 33. The outer extremity of the shaft 46 is threaded to screw into the threaded bore 41, so that the threaded bore 41 and the threaded shaft portion 48 provide interengaging means for moving the movable element 38. On the inner end of the shaft 46 is a large knob or handwheel 49. Thus, in order to clamp the split collar 36 upon the upper end portion 35 of the hinge pin 32 it is only necessary for an operator in the cab to rotate the manual locking screw 45 clockwise as seen in FIG. 3. Opposite rotation of the manual locking screw 45 releases the split collar from its engagement with the exposed end portion of the hinge pin 32.

The locking arrangement makes it possible for the operator to open the forward observation windows 16 to any desired position and secure the window firmly in that position so that it is not disturbed or moved by vibration of the grader or the jolting to which it may be subjected in operation.

Referring now particularly to FIG. 2, it is seen that the pivot axis 24 provided by the upper and lower hinge members 27 and 26, respectively, is so positioned laterally that there is an area 50 of the window which is between the pivot axis and the main frame 11. It is apparent from FIG. 2 that when the window 16 is opened outwardly the area 50 of the window swings inwardly about the pivot axis. This prevents the opening of the window from interfering with the wiper arm 51 (mounted on pivot 53) and wiper blade 52 which occupy a generally upright parked position which is primarily aligned with the area 50 of the window.

The foregoing detailed description is given for clearness of understanding only and no unnecessary limitations should be understood therefrom, as modifications will be obvious to those skilled in the art.

We claim:

1. A window structure for an enclosed cab of a motor vehicle which has a wall provided with a window opening that has transverse top and bottom margins and upright side margins, said window structure comprising, in combination:

a window including a frame that has a top cross bar, a bottom cross bar, and upright side bars, said frame fitting loosely in the window opening, and glass in said frame;

top and bottom hinges outside said cab which mount said window in the opening for outward swinging movement about an upright pivot axis, each of said hinges having a first bracket secured in abutting relationship to an upright outer surface of the cab wall immediately adjacent to the window opening, one of said first brackets having an integral split collar with opposed arcuate surfaces on said one of said first brackets and on the free end of the split collar, said opposed arcuate surfaces defining a socket, each of said hinges also having a second bracket secured to the outer surface of one of said frame bars, and a hinge pin integral with one of said second brackets and rotatable in said socket;

a shaft which is journalled in a hole in the cab wall, said shaft having a threaded outer end portion which is screwed into a threaded hole in the free end portion of the split collar so that rotation of said shaft flexes said split collar to selectively clamp or release the hinge pin, there being a handle on the inner end of said shaft for rotation thereof from inside the cab;

and sealing means for sealing said window in the opening when it is closed.

2. A window structure for an enclosed cab of a motor vehicle which has a wall provided with a window opening that has transverse top and bottom margins and upright side margins, said window structure comprising, in combination:

a window including a frame that has a top cross bar, a bottom cross bar, and upright side bars, said frame fitting loosely in the window opening; and glass in said frame;

top and bottom hinges outside said cab which mount said window in the opening for outward swinging movement about an upright pivot axis, each of said hinges having a first bracket secured in abutting relationship to an upright outer surface of the cab wall immediately adjacent to the window opening, one of said first brackets having an integral split collar with opposed arcuate surfaces on said one of said first brackets and on the free end of the split collar, said opposed arcuate surfaces defining a socket, each of said hinges also having a second bracket secured to the outer surface of one of said frame bars, and a hinge pin integral with one of said second brackets and rotatable in said socket;

a frame member abutting the inner surface of the cab wall in register with said one of said first brackets, there being aligned holes in said frame member and said one of said first brackets which communicate with a concentric hole of larger diameter in the cab wall, and there being recesses in said frame member and in said one of said first brackets surrounding said aligned holes and which face the hole in the cab wall and are of substantially the same diameter as said hole in the cab wall;

a shaft which impales said aligned holes and is journalled in the hole in the frame member, said shaft being provided with a disc-like bearing member which is journalled in the hole in the cab wall, said shaft having a threaded outer end portion which engages a threaded hole in the free end portion of the split collar so that rotation of the shaft flexes said split collar to selectively clamp or release the hinge pin, and said shaft having a handle on its inner end by means of which it may be manually rotated;

a pair of washers in the aforesaid recesses between which the disc-like bearing on the shaft is confined;

and sealing means for sealing said window in the opening when it is closed.

3. In a motor grader which has a longitudinal main frame, an enclosed cab at the rear of said main frame which has a front wall that extends laterally beyond both sides of the main frame, a sealed windshield above the main frame, and spaced below the windshield flanking the main frame a pair of window openings in the front wall, a forward observation window structure in each of said window openings through which an operator may observe the grader blade and the graded area, each said window structure comprising, in combination:

a window including a frame that has a top cross bar, a bottom cross bar, and upright side bars, said frame fitting loosely in the window opening, and glass in said frame;

top and bottom hinges outside said cab which mount said window in the opening for forward swinging movement about an upright pivot axis which is adjacent the main frame, each of said hinges having a first bracket secured in abutting relationship to an upright outer surface of the cab wall immediately adjacent to the window opening, one of said first brackets having an integral split collar with opposed arcuate surfaces on said one of said first brackets and on the free end of the split collar, said opposed arcuate surfaces defining a socket, each of said hinges also having a second bracket secured to the outer surface of one of said frame bars, and a hinge pin integral with one of said second brackets and rotatable in said socket;

a shaft which is journalled in a hole in the cab wall, said shaft having a threaded outer end portion which is screwed into a threaded hole in the free end portion of the split collar so that rotation of said shaft flexes said split collar to selectively clamp or release the hinge pin, there being a handle on the inner end of said shaft for rotation thereof from inside the cab;

and sealing means for sealing said window in the opening when it is closed.

4. In a motor grader which has a longitudinal main frame, an enclosed cab at the rear of said main frame which has a front wall that extends laterally beyond both sides of the main frame, a sealed windshield above the main frame, and spaced below the windshield flanking the main frame a pair of window openings in the front wall, a forward observation window structure in each of said window openings through which an operator may observe the grader blade and the graded area, each said window structure comprising, in combination:

a window including a frame that has a top cross bar, a bottom cross bar, and upright side bars, said frame fitting loosely in the window opening, and glass in said frame;

top and bottom hinges outside said cab which mount said window in the opening for forward swinging movement about an upright pivot axis which is adjacent the main frame, each of said hinges having a first bracket secured in abutting relationship to an upright outer surface of the cab wall immediately adjacent to the window opening, one of said first brackets having an integral split collar with opposed arcuate surfaces on said one of said first brackets and on the free end of the split collar, said opposed arcuate surfaces defining a socket, each of said hinges also having a second bracket secured to the outer surface of one of said frame bars, and a hinge pin integral with one of said second brackets and rotatable in said socket;

a frame member abutting the inner surface of the cab wall in register with said one of said first brackets, there being aligned holes in said frame member and in said one of said first brackets which communicate with a concentric hole of larger diameter in the cab wall, and there being recesses in said frame member and in said one of said first brackets surrounding said aligned holes and which face the hole in the cab wall and are of substantially the same diameter as said hole in the cab wall;

a shaft which impales said aligned holes and is journalled in the hole in the frame member, said shaft being provided with a disc-like bearing member which is journalled in the hole in the cab wall, said shaft having a threaded outer end portion which engages a threaded hole in the free end portion of the split collar so that rotation of the shaft flexes said split collar to selectively clamp or release the hinge pin, and said shaft having a handle on its inner end by means of which it may be manually rotated;

a pair of washers in the aforesaid recesses between which the disc-like bearing member on the shaft is confined;

and sealing means for sealing said window in the opening when it is closed.

5. In a motor grader which has a longitudinal main frame, an enclosed cab at the rear of said main frame which has a front wall that extends laterally beyond both sides of the main frame, a sealed windshield above the main frame, and spaced below the windshield flanking the main frame a pair of window openings in the front wall, a forward observation window structure in each of said window openings through which an operator may observe the grader blade and the graded area, each said window structure comprising, in combination;

a window including a frame that has a top cross bar, a bottom cross bar, and upright side bars, said frame fitting loosely in the window opening, and glass in said frame;

top and bottom hinges mounting said window in the opening for forward swinging movement about an upright pivot axis which is spaced laterally outwardly a short distance from a side of the window opening that is nearest to the main frame, whereby the portion of the window between the pivot axis and said side of the window opening swings rearwardly as the window is opened forwardly, one of said hinges including a bracket secured to an upright surface of the cab wall immediately adjacent the window opening and providing a socket defined by a fixed arcuate surface of the bracket and an arcuate surface of a movable element opposed to said fixed surface, and there being a hinge pin on the window frame which is received in said socket;

a shaft which is manually rotatable from inside the cab, and interengaging means on the shaft and on the movable element for moving the latter to clamp the hinge pin between said arcuate surfaces;

and windshield wiper means for the window which includes a wiper pivot on the cab wall adjacent the main frame and the upright pivot axis, a wiper arm on said wiper pivot and a blade on said arm, said arm and blade occupying a generally upright parked position which is predominantly forward of said portion of the window which swings rearwardly as the window is opened forwardly.

* * * * *